(12) United States Patent
Kumar et al.

(10) Patent No.: US 11,710,130 B2
(45) Date of Patent: Jul. 25, 2023

(54) FALSE FRAUDULENT CORRECTION METHODS AND APPARATUSES

(71) Applicant: Visa International Service Association, San Francisco, CA (US)

(72) Inventors: Satish Kumar, Foster City, CA (US); Vinoth Kumar Kalaiselvan, Dublin, CA (US)

(73) Assignee: Visa International Service Association, San Francisco, CA (US)

( * ) Notice: Subject to any disclaimer, the term of this patent is extended or adjusted under 35 U.S.C. 154(b) by 194 days.

(21) Appl. No.: 17/147,304

(22) Filed: Jan. 12, 2021

(65) Prior Publication Data

US 2022/0222676 A1 Jul. 14, 2022

(51) Int. Cl.
*G06Q 20/38* (2012.01)
*G06Q 20/40* (2012.01)
*G06Q 20/02* (2012.01)

(52) U.S. Cl.
CPC ....... *G06Q 20/4016* (2013.01); *G06Q 20/027* (2013.01); *G06Q 20/385* (2013.01); *G06Q 20/389* (2013.01); *G06Q 20/405* (2013.01); *G06Q 20/4093* (2013.01); *G06Q 20/4097* (2013.01)

(58) Field of Classification Search
CPC ............ G06Q 20/4093; G06Q 20/385; G06Q 20/4016; G06Q 20/4097
USPC ......................................................... 705/75
See application file for complete search history.

(56) References Cited

U.S. PATENT DOCUMENTS

| 7,331,518 | B2 | 2/2008 | Rable |
| 10,726,424 | B1* | 7/2020 | Yee ......................... H04L 67/02 |
| 2010/0305993 | A1 | 12/2010 | Fisher |
| 2013/0024358 | A1* | 1/2013 | Choudhuri ......... G06Q 20/4016 705/38 |

(Continued)

OTHER PUBLICATIONS

Paasch, Carsten A. W, Credit card fraud detection using artificial neural networks tuned by genetic algorithms, Feb. 2008, pp. 105, 167-168, 208 (Year: 2008).*

(Continued)

*Primary Examiner* — Mohammad A. Nilforoush
*Assistant Examiner* — Wodajo Getachew
(74) *Attorney, Agent, or Firm* — Schwabe, Williamson & Wyatt, PC

(57) ABSTRACT

A computer-implemented method and apparatus are provided to reduce false fraudulent declines of transactions. Payment processor (PP) systems may be provided with a request acceptor and a replacement transaction generator. The request acceptor receives a notification of a decline of a first transaction attempted by a cardholder with a merchant, for allegedly fraudulent, and a request to determine whether the first transaction was falsely identified as fraudulent, and if so, to remedy the first transaction. The replacement transaction generator generates, in response to a determination that the first transaction was falsely identified as fraudulent, and the merchant is a false fraudulent reduction partner merchant, a replacement second transaction to replace the declined first transaction. The replacement second transaction may include a bypass authorization code, and made available to the cardholder to use to transact with the merchant bypassing the declined first transaction.

19 Claims, 7 Drawing Sheets

(56) References Cited

U.S. PATENT DOCUMENTS

| | | |
|---|---|---|
| 2014/0012738 A1 | 9/2014 | Woo |
| 2015/0095215 A1* | 4/2015 | Clarke .............. G06Q 20/4016 |
| | | 705/39 |
| 2015/0193773 A1* | 7/2015 | Mattioli .............. G06Q 20/407 |
| | | 705/18 |
| 2017/0357977 A1 | 12/2017 | Pitz |
| 2018/0121919 A1* | 5/2018 | Song ................. G06Q 20/4016 |
| 2021/0192532 A1* | 6/2021 | Thomson ............. G06Q 20/388 |

OTHER PUBLICATIONS

International Search Report and Written Opinion for PCT/US2021/057386 dated Feb. 2, 2022; 8 pages.

* cited by examiner

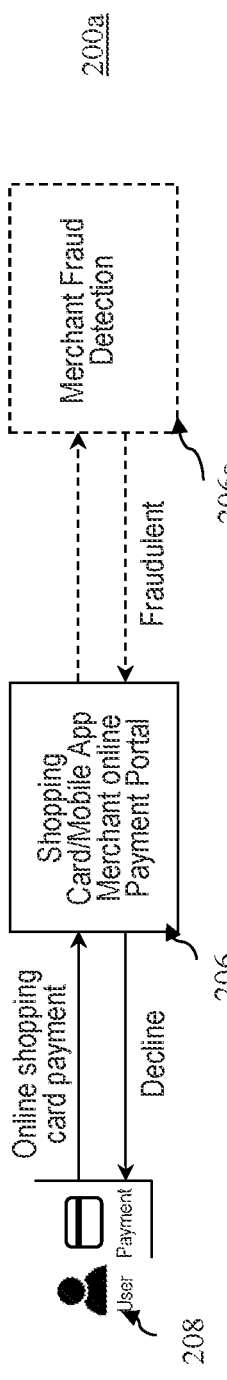
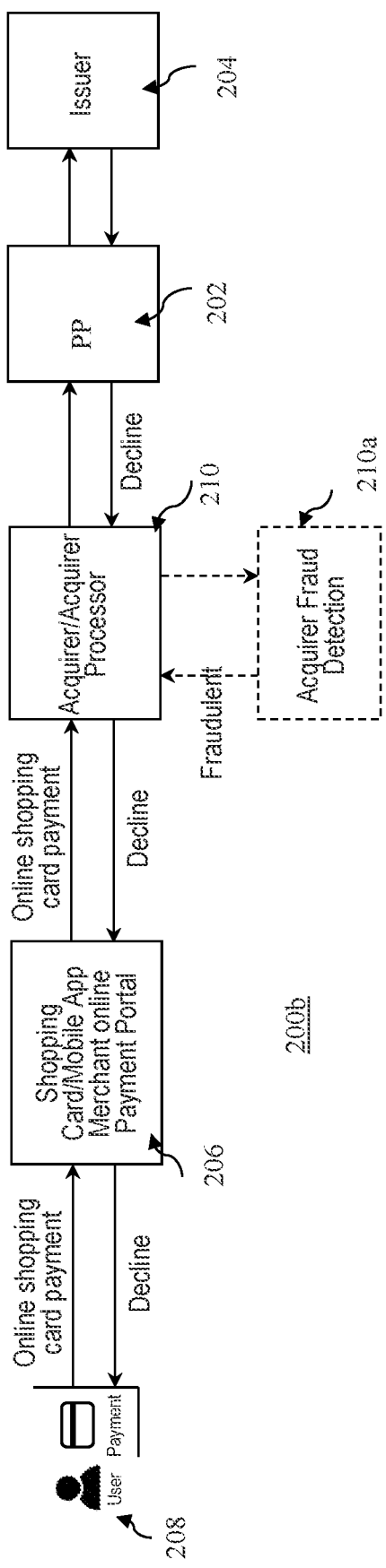
Figure 2A
Figure 2B

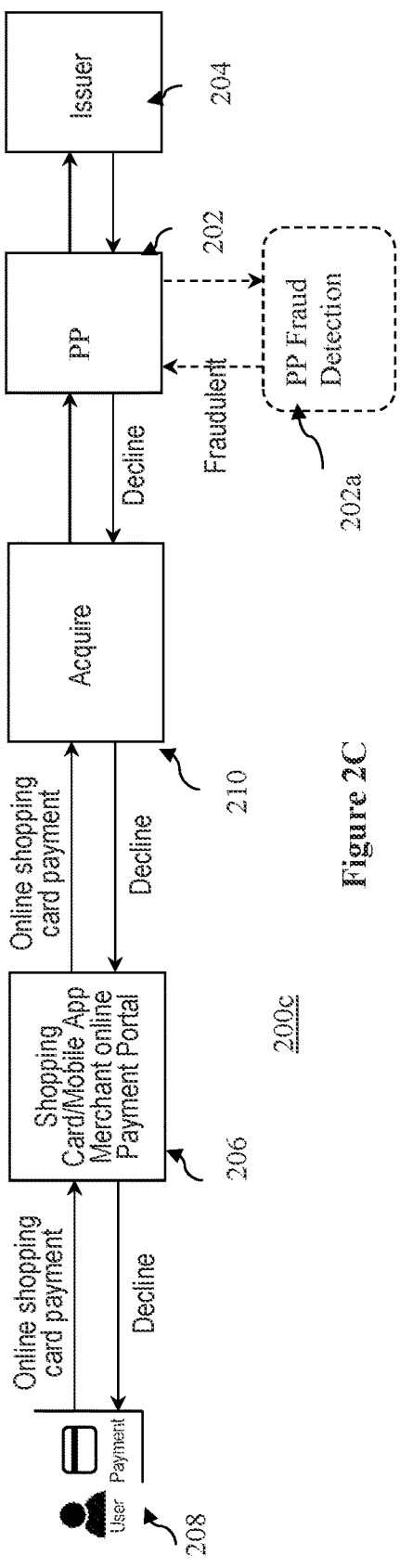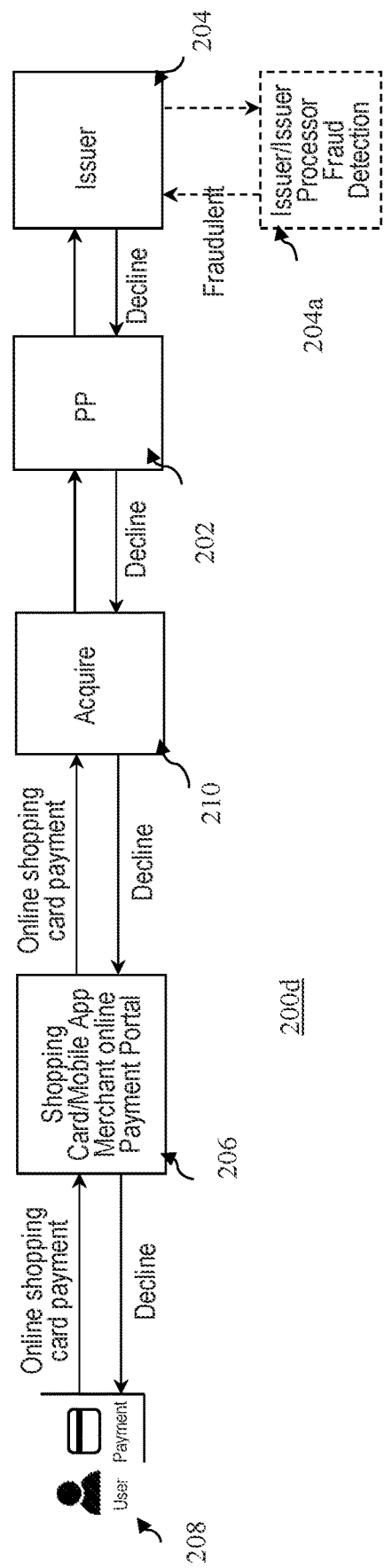

500

Your recent transaction of $xx.xx has been declined <due to optional reason>. If you would like to override the decline and perform this transaction, please re-submit this transaction at <link> e.g., https://vi.sa/a23234343

Registrar
602

Request Acceptor
604

User Communicator
606

Merchant Communicator
608

Transaction Data Collector
610

Replacement Transaction Builder
612

Figure 6

FALSE FRAUDULENT CORRECTION METHODS AND APPARATUSES

BACKGROUND

Payment systems providers, including banks, networks and processors, generate revenue by providing access to payment systems for end parties, including consumers, merchants and enterprises. Processors and networks also generate money by providing payment services to intermediaries such as banks. In most payments systems (e.g., both open loop and closed loop), providers have a direct business relationship with end party customers. Providers set prices for the services, as do other businesses. Providers realize revenue from payments through direct and indirect sources. Direct revenue comes from fees explicitly charged to the end party, i.e. consumers and enterprises, and these may include transaction fees, interest on associated loans, monthly maintenance fees, and exception fees. Indirect revenue comes from the interest income on deposit balances, float and interchange.

It has been estimated that friendly fraud has been increasing at a rate of 41% every two years. Roughly 40% of consumers who commit friendly fraud will do it again within 60 days. As a result, there has been growing adoption of Fraud Detection and Prevention (FDP) systems in order to fight fraud at multiple levels during electronic payment processing. A wide array of FDP solutions are now available for Merchants, Acquirers, Acquirer processor, Issuers and Issuers processor. Transactions can be declined by merchant/acquirer, processor, Payment Network or Issuers or Issuer's processor FDP solutions. Per month, 800 k transactions are marked as fraud and declined by PP (Visa's) Advanced Authorization Fraud Detection.

Fraud detection is a relatively hard problem. False positives of fraud detection, that is incorrect identification of legitimate transactions as fraudulent, is almost unavoidable, and often result in poor consumer experience. Ratio of false positives for cross border transaction is higher even, since processing parties apply stricter rules on cross border transaction processing. It is estimated that 3% to 4% of total cross border transactions are declined by wrong rules.

Accordingly, it would be desirable to provide a framework for reducing the number of transactions declined for false fraudulent identification.

BRIEF SUMMARY

The exemplary embodiments provide methods and systems for correcting false fraudulent declines of transactions, thereby reducing the amount of false fraudulent declines of transactions, and providing better consumer experiences. In various embodiments, payment processor provider and merchant systems are provided with respective aspects of the false fraudulent correction service of the present disclosure.

In various embodiments, payment processor provider systems are provided with a request acceptor and a replacement transaction generator on one or more servers. The request acceptor is configured to enable the payment processor provider to receive a notification of a decline of a first transaction attempted by a cardholder of a payment card with a merchant, for allegedly fraudulent, and a request to determine whether the first transaction was falsely identified as fraudulent, and to remedy the first transaction in response to a determination that the first transaction was falsely identified as fraudulent. The notification and request may be received from a selected one of the merchant, a payment acquirer processor, or an issuer of the payment card. The replacement transaction generator is configured to generate, in response to a determination that the first transaction was falsely identified as fraudulent, and the merchant is a false fraudulent reduction partner merchant, a replacement second transaction to replace the declined first transaction. The replacement second transaction includes a bypass authorization code. The replacement second transaction having the bypass authorization code is made available to the cardholder. The cardholder then uses the replacement second transaction to transact with the merchant bypassing the declined first transaction.

In various embodiments, the merchant systems are provided with a payment processor communicator and a bypass authorization code generator on one or more servers. The payment processor communicator is configured to provide to a false fraudulent correction service of a payment processor provider, a notification of a declined first transaction, for allegedly fraudulent, and a request to determine whether the first transaction was falsely identified as fraudulent, and to remedy the first transaction in response to a determination that the first transaction was falsely identified as fraudulent. The bypass authorization code generator is configured to generate for the false fraudulent correction service of the payment processor provider a bypass authorization code, for the false fraudulent correction service to include in a second transaction the false fraudulent correction service generates and provides to the cardholder to transact with the merchant, to remedy the falsely declined first transaction.

In some embodiments, the payment processor provider systems are further provided with a cardholder communicator on one or more servers. The cardholder communicator is configured to communicate with the cardholders, including notifying a cardholder of a declined transaction, for allegedly fraudulent, and asking the cardholder to confirm whether the fraudulent determination was false, and if so, whether the cardholder desires to remedy the falsely declined transaction.

In some embodiments, the payment processor provider systems are further provided with a registrar on one or more servers. The registrar is configured to register merchants as false fraudulent transaction correction partner merchants equipped to provide the payment processor provider systems with bypass authorization codes for inclusion in replacement transactions to remedy falsely declined transactions.

In some embodiments, the payment processor provider systems are further provided with a merchant communicator on one or more servers. The merchant communicator is configured to enable the payment processor provider systems to securely obtain from the partner merchants the bypass authorization codes for inclusion in replacement transactions.

In some embodiments, the payment processor provider systems are further provided with a transaction data collector on one or more servers. The transaction data collector is configured to enable the payment processor provider systems to gather data associated with the falsely declined transaction, and use the gathered data to construct the replacement transaction.

BRIEF DESCRIPTION OF SEVERAL VIEWS OF THE DRAWINGS

FIGS. 2A-2D are flow diagrams illustrating example declines of allegedly fraudulent transactions.

FIG. 5 illustrates an example notification message to a cardholder, according to some embodiments.

FIG. 6 illustrates in further detail components of the false fraudulent correction service of the payment systems provider, according to some embodiments.

DETAILED DESCRIPTION

The exemplary embodiment relates to methods and systems for correcting falsely declined transactions for allegedly being fraudulent, to reduce the amount of false fraudulent decline of transactions. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
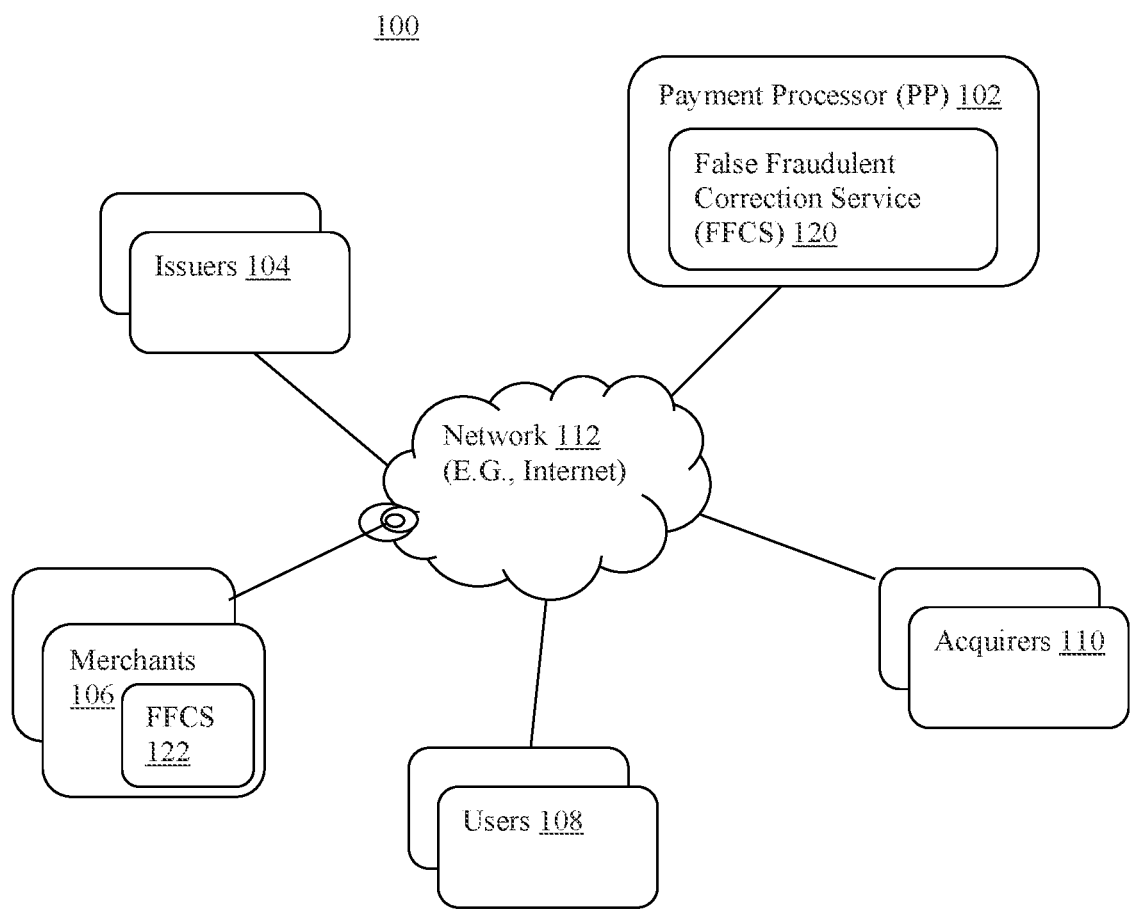
FIG. 1 is a block diagram illustrating an example network of payment processing system, according to some embodiments.

FIG. 1 is a block diagram illustrating an example network of payment processing system, according to some embodiments. The payment system 100 includes systems/servers of a payment processor provider 102, issuers 104, merchants 106, users or cardholders 108, and acquirers 110 coupled with each other via one or more public and/or private networks (including e.g., the Internet) 112. For the description to follow, payment processor provider 102 may simply be referred to as payment processor (or PP) 102. As illustrated, in various embodiments, at least the one or more servers of payment processor 102 and merchants 106 are provided with complementary aspects of the false fraudulent correction service (FFCS) of the present disclosure 120 and 122, to be described more fully below.

The payment processor 102 may refer to an entity that receives transaction authorization requests from the merchant 106 and other entities and provides guarantees of payment, in some cases through an agreement between the payment processor 102 and the issuer 104. In embodiments, where the servers of the payment processor 102 are equipped with the false fraudulent correction service 120, the payment processor 102 may also receive notifications of declined transactions for allegedly fraudulent, and requests to determine whether the transactions are indeed fraudulent, and remedy the falsely declined transactions if the decline is determined to be false fraudulent. The payment processor 102 may receive such notifications and requests from issuers 104, merchants 106, and/or acquirers 110. Except for the false fraudulent correction services of the present disclosure, examples of a payment processor may include Visa®, MasterCard®, American Express®, or any other entity that processes credit card transactions, debit card transactions, and other types of commercial transactions.

In some embodiments, an acquiring bank or acquirer 110 may forward the payment card details from the merchant 106 to the payment processor 102. Payment card transaction details sent over the network 112 are received by the one or more servers of the payment processor 102 and processed by, for example, by a payment authorization process, and/or forwarded to an issuer 104. Details of the payment card transaction may be stored as payment transaction records in a transaction database within or accessible to the servers of payment processor 102.

The servers of the payment processor 102 may be organized into data processing subsystems, networks, and operations used to support and deliver payment related services (e.g., authentication services, authorization services, exception file services, and clearing and settlement services, etc.). The term server may refer to one or more computing devices, such as processors, storage devices, and/or similar computer components, that communicate with client devices and/or other computing devices over network 112, such as the Internet or private networks and, in some examples, facilitate communication among other servers and/or client devices. For example, the server computer can be a large mainframe, a minicomputer cluster, or a group of servers functioning as a unit. In one example, the server computer may be a database server coupled to a Web server, and may include or be coupled to a database.

The issuer 104 or card issuer, may refer to one or more entities that provide payment accounts to individuals (e.g., cardholders, customers, and/or the like) for conducting transactions, such as credit payment transactions and/or debit payment transactions. Typically, an issuer is a financial institution. The issuer 104 may provide an account or card identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, an issuer may also include reference to an "issuer system" comprising one or more computer systems operated by or on behalf of an issuer executing one or more software applications. For example, an issuer system may include one or more authorization servers for authorizing a transaction.

The payment processor 102 is in communication with the issuer 104 and the merchant 106 via network 112, which may comprise a private network or a public network, such as the Internet. As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a request or message may refer to a network packet (e.g., a data packet and/or the like) that includes data.

The merchant 106 may refer to one or more entities (e.g., operators of retail businesses) that provide goods and/or services, and/or access to goods and/or services, to a cardholder, based on a transaction, such as a payment transaction. As used herein "merchant system" may refer to one or more computer systems operated by or on behalf of a merchant, such as a server executing one or more software applications. The merchant 106 may include a point-of-sale (POS) device (not shown) that may be used by the merchant 106 to conduct and/or process transactions with cardholders.

The user or cardholder 108 is a user who is authorized to conduct transactions with the payment account provided by the issuer 104. The user/cardholder 108 can be, for example, the account owner of the account associated with a payment card, or an individual who is authorized to use the account on behalf of the account owner. The terms "cardholder" and "user" may be used interchangeably in the following description. The cardholder 108 initiates a transaction for goods/services of the merchant 106 using a payment card associated with the payment account.

The payment card (or simply "card") may be a physical instrument containing an account identifier associated with an account used for conducting transactions. Examples of a payment card include a credit card, debit card, charge card, gift card, loyalty card, smartcard, payroll card, healthcare card or any combination thereof. As another example, the payment card may be an electronic device that is used to conduct transactions, such as a mobile phone using a wallet application, smart media, a wristband, a machine-readable medium containing account information, a keychain device or fob, or an RFID transponder. The payment card may include a volatile or a non-volatile memory to store information (e.g., an account identifier, a name of the account holder, and/or the like). In another embodiment, the payment card may include the computer the cardholder 108 uses to enter account information into to make an online purchase from a website of the merchant 106. A "card present" or a "face-to-face (F2F)" transaction" refers to a transaction in which a cardholder 108 uses the payment card to interact physically with a payment system, such as POS terminal.

In some non-limiting embodiments, the issuer 104 may provide an account identifier (e.g., a PAN, a token, and/or the like) to the cardholder 108 that uniquely identifies one or more accounts associated with that user. As used herein, the term "account identifier" may refer to one or more types of identifiers associated with an account (e.g., a PAN associated with an account, a card number associated with an account, a payment card number associated with an account, a token associated with an account, and/or the like). The account identifier may be embodied on the payment card (e.g., a payment card, a credit card, a debit card, a gift card, and/or the like) and/or may be electronic information communicated to the user for use during electronic transactions. Account identifiers may be alphanumeric, any combination of characters and/or symbols, and/or the like.

Once the cardholder 108 presents the account identifier to the POS device for a transaction, the POS device or other computer forwards the account identifier along with other transactional details, such as the payment amount, to the acquirer 110. As used herein, "acquiring" refers to functions supporting a merchant's needs in card payment acceptance, including POS terminals, software, a card processing, dispute management and merchant customer service. The acquirer 110 may route the transaction authorization requests to the payment systems provider.

The transaction authorization request is an electronic message that is sent to request authorization for a transaction. The transaction authorization request can be sent, for example, to the payment processor 102 and/or the issuer 104 of the payment card. The transaction authorization request may include an issuer account identifier that may be associated with the payment card or payment account. The transaction authorization request may also comprise "transaction information," including any information associated with a current transaction, such as the transaction amount, merchant identifier, merchant location, etc., as well as any other information that may be utilized in determining whether to identify and/or authorize a transaction.

After the payment processor 102 receives the transaction authorization requests, the payment processor 102 sends authorization data, e.g., payment authorization, to the appropriate issuer 104. The issuer 104 is configured to receive authorization data from the payment processor 102 (e.g., from an authorization server). Once the authorization data is received, the issuer 104 determines if the cardholder 108 is authorized to perform the given transaction (e.g., payment, cash deposit/withdrawal, money transfer, balance inquiries), and returns an authorization response message (not shown).

The authorization response message may be an electronic message reply to the transaction authorization request. The authorization response message may include, by way of example only, one or more of the following status indicators: Approval-transaction was approved; Decline—transaction was not approved; or Call Center—response pending more information, merchant must call the toll-free authorization phone number. The authorization response message may also include an authorization code, which may be a code that the issuer 104 returns in response to transaction authorization request in an electronic message (either directly or through the payment systems provider) to the merchant's POS device indicating approval of the transaction. The code may serve as proof of authorization.

When an end party in one country, e.g., cardholder 108, conducts a payment card transaction with an end party, e.g., merchant 106, in another country, the transaction may be referred to as a cross-border transaction. Both consumers and businesses use payment cards to make cross-border payments and the ability to provide the service to international travelers is a major contributor to revenue, growth and success of the payment processor 102 and to the issuer 104.

FIGS. 2A-2D are flow diagrams illustrating example declines of allegedly fraudulent transactions, according to some embodiments. FIG. 2A illustrates an example decline 200a for allegedly fraudulent by a merchant 206, according to some embodiments. In FIG. 2A, a user/cardholder 208 may attempt to initiate a transaction with a merchant 206, using a payment card. User/cardholder 208 and merchant 206 may be user/cardholder 108 and merchant 106 of FIG. 1. In these embodiments, merchant 206 is equipped with a fraud detection system 206a. Fraud detection system 206a may be any one of a number of fraud detection system known in the art. Accordingly, the transaction may be correctly or falsely declined by merchant 206 for allegedly fraudulent.

FIG. 2B illustrates an example decline 200b for allegedly fraudulent by an acquirer 210, according to some embodiments. In FIG. 2B, a user/cardholder 208 may attempt to initiate a transaction with a merchant 206, using a payment card, and the transaction is forwarded on to the acquirer 210. User/cardholder 208, merchant 206 and acquirer 210 may be user/cardholder 108, merchant 106 and acquirer 110 of FIG. 1. In these embodiments, acquirer 210 is equipped with a fraud detection system 210a. Similarly, fraud detection system 210a may be any one of a number of fraud detection system known in the art. Accordingly, the transaction may be correctly or falsely declined by acquirer 210 for allegedly fraudulent, and not forwarded onto payment processor 202 and/or issuer 204.

FIG. 2C illustrates an example decline 200c for allegedly fraudulent by a payment processor 202, according to some embodiments. In FIG. 2C, a user/cardholder 208 may attempt to initiate a transaction with a merchant 206, using a payment card, and the transaction is forwarded on to the payment processor 202 via the acquirer 210. User/cardholder 208, merchant 206, acquirer 210 and payment processor 202 may be user/cardholder 108, merchant 106, acquirer 110 and payment processor 102 of FIG. 1. In these embodiments, payment processor 202 is equipped with a fraud detection system 202a. Similarly, fraud detection system 202a may be any one of a number of fraud detection system known in the art. Accordingly, the transaction may be correctly or falsely declined by payment processor 202 for allegedly fraudulent, and not forwarded onto issuer 204.

FIG. 2D illustrates an example decline 200d for allegedly fraudulent by a payment processor 202, according to some embodiments. In FIG. 2D, a user/cardholder 208 may attempt to initiate a transaction with a merchant 206, using a payment card, and the transaction is forwarded on to the issuer 204 via the acquirer 210 and the payment processor 202. User/cardholder 208, merchant 206, acquirer 210, payment processor 202 and issuer 204 may be user/cardholder 108, merchant 106, acquirer 110, payment processor 102 and issuer 104 of FIG. 1. In these embodiments, issuer 204 is equipped with a fraud detection system 204a. Similarly, fraud detection system 204a may be any one of a number of fraud detection system known in the art. Accordingly, the transaction may be correctly or falsely declined by issuer 204 for allegedly fraudulent.

In summary, a transaction initiated by a user/cardholder 208 may be correctly or falsely declined by merchant 206, acquirer 210, payment processor 202 or issuer 204 for allegedly fraudulent.

Figure 3:
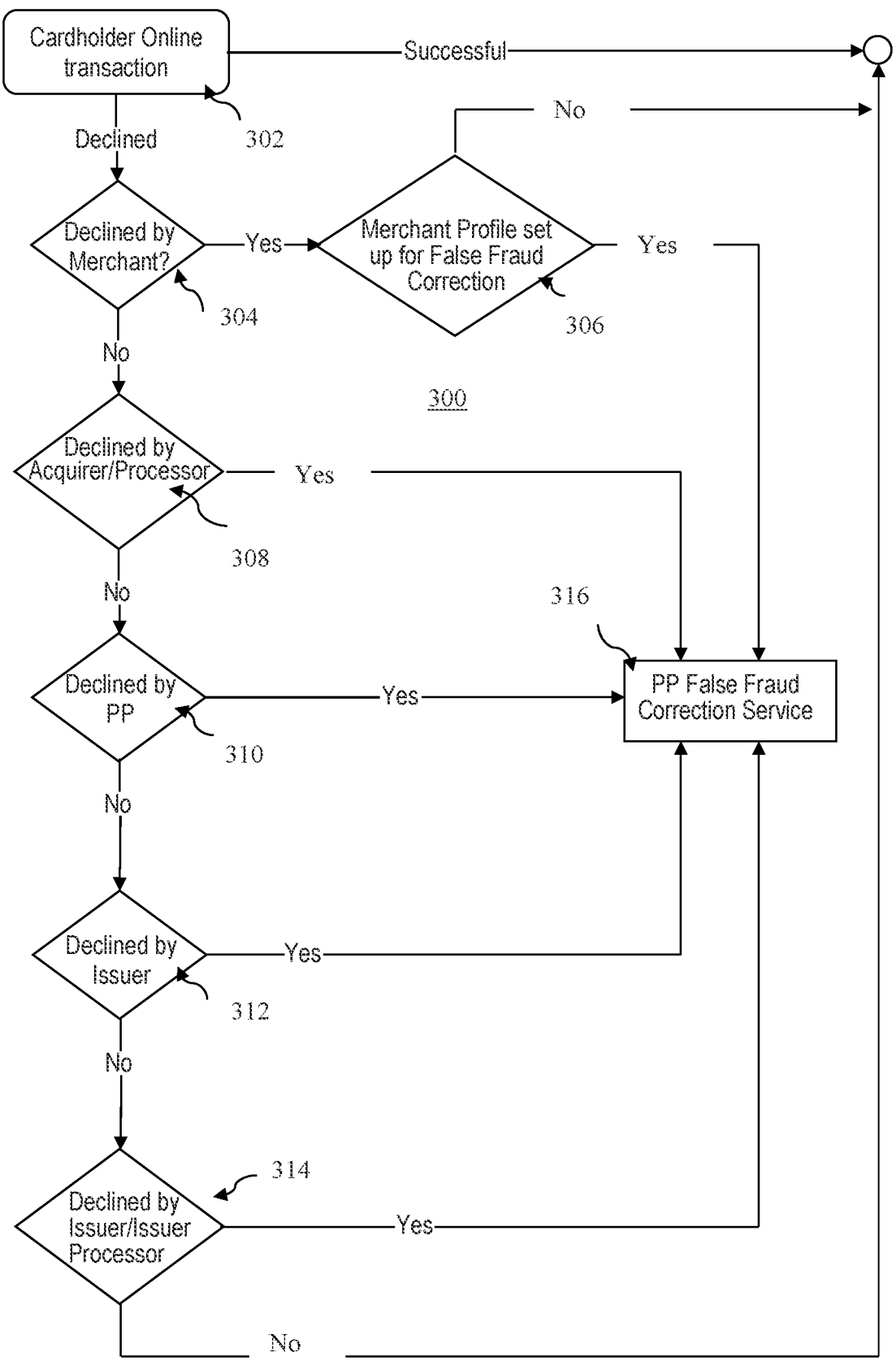
FIG. 3 illustrates an example process for reducing false fraudulent decline of transactions, according to some embodiments.

FIG. 3 illustrates an example process for reducing false fraudulent decline of transactions, according to some embodiments. Process 300 for reducing false fraudulent decline of transactions starts at block 302 with a user/cardholder initiating a transaction with a payment card with a merchant. The attempted transaction may be successful or declined. If the transaction is successful, process 300 terminates. If the transaction is declined, process 300 continues with blocks 304-312 depending on whether the decline was made by the merchant, an acquirer, the payment processor or the issuer.

At block 304 where the decline was made by the merchant, process 300 continues to block 306. At block 306, if the merchant is not equipped with the complementary aspect of false fraudulent correction device, to provide the payment processor with a bypass authorization code for inclusion in a replacement transaction to remedy the declined transaction, process 300 terminates. On the other hand, if the merchant is equipped with the complementary aspect of false fraudulent correction device, to provide the payment processor with a bypass authorization code for inclusion in a replacement transaction to remedy the declined transaction, the declined transaction is reported by the merchant to the false fraudulent correction service of the payment processor to determine at block 316 whether the transaction is indeed fraudulent, and if not, remedy the transaction.

At block 308, where the decline was made by an acquirer, the declined transaction is reported by the acquirer to the false fraudulent correction service of the payment processor to determine at block 316 whether the transaction is indeed fraudulent, and if not, remedy the transaction. At block 310, where the decline was made by the fraudulent detection system of a payment processor, the declined transaction is reported by the fraudulent detection system of the payment processor to the false fraudulent correction service of the payment processor to determine at block 316 whether the transaction is indeed fraudulent, and if not, remedy the transaction.

At block 312, where the decline was made by an issuer, the declined transaction is reported by the issuer to the false fraudulent correction service of the payment processor to determine at block 316 whether the transaction is indeed fraudulent, and if not, remedy the transaction. At block 314, where the decline was made by an issuer processor, the declined transaction is reported by the issuer processor to the false fraudulent correction service of the payment processor to determine at block 316 whether the transaction is indeed fraudulent, and if not, remedy the transaction.

Figure 4:
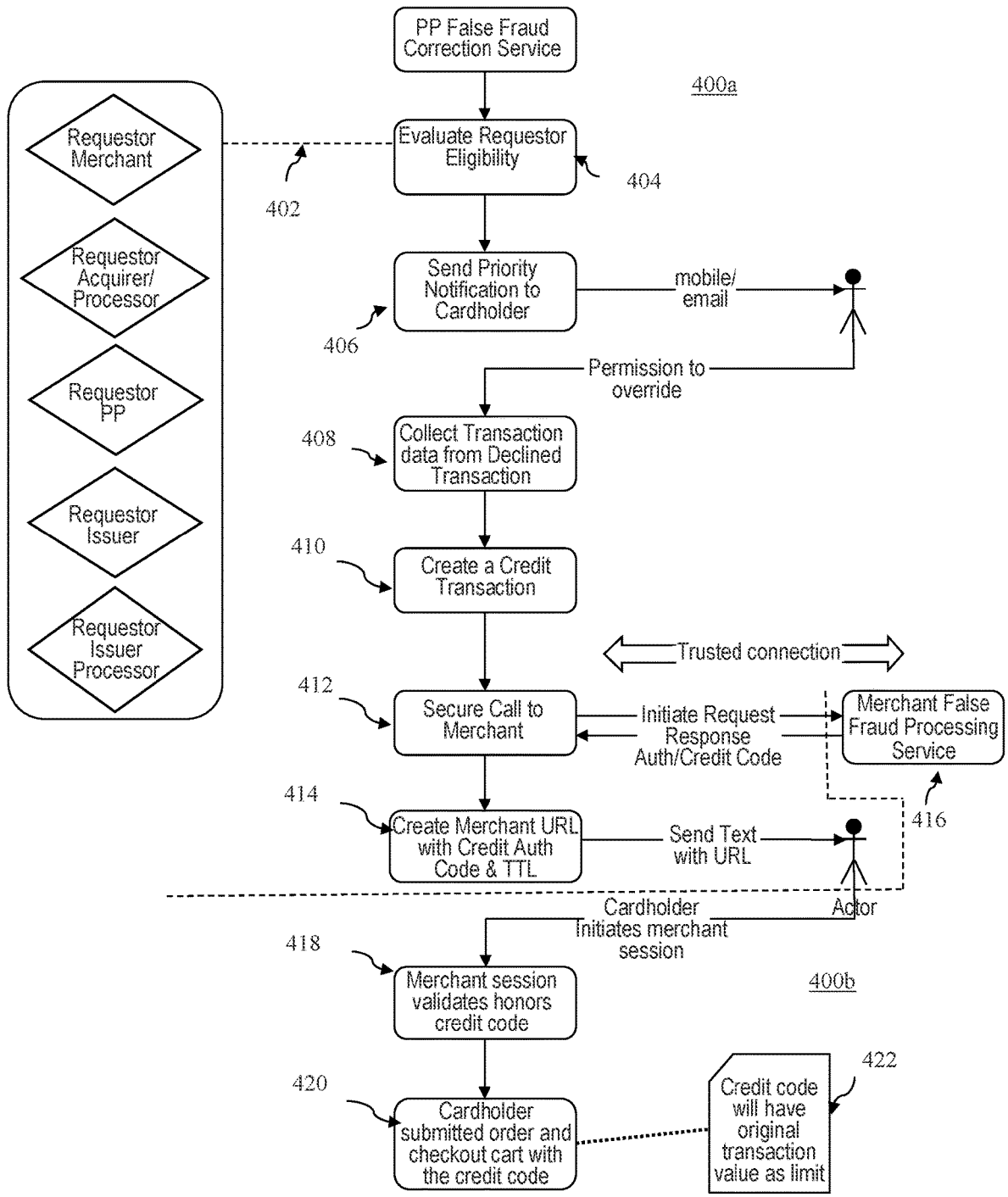
FIG. 4 illustrates an example process for correcting false fraudulent decline of transactions, according to some embodiments.

FIG. 4 illustrates an example process for correcting false fraudulent decline of transactions, according to some embodiments. The example process include process 400a performed by the false fraudulent correction service of a payment processor, e.g., payment processor 102 of FIG. 1 or payment processor 202 of FIGS. 2A-2D, and process 400b performed by the merchant, e.g., merchant 106 of FIG. 1 or merchant 206 of FIGS. 2A-2D.

Process 400a for correcting false fraudulent decline of transactions by a payment processor starts at block 402 where a notification of a declined transaction for allegedly fraudulent, and a request to determine whether the transaction is indeed fraudulent, and if not, remedy the transaction is made by a selected one of a merchant, an acquirer, a fraud detection system of a payment processor, an issuer or an issuer processor.

Next at block 404, process 400a may determine the eligibility of the notification and request for false fraudulent correction service. In various embodiments, the eligibility may depend on the merchant having the complementary capability to provide the payment processor with the bypass authentication code for inclusion in a replacement transaction to replace/bypass the initial declined transaction. In other embodiments, eligibility may further depend on whether the reporter (i.e., the merchant, the acquirer, the issuer or the issuer processor) has registered for the false fraudulent correction service, e.g., for a fee.

At block 406, assuming the notification and request is eligible for false fraudulent correction service, a priority message may be sent to the user/cardholder informing the user/cardholder of the decline for allegedly fraudulent, and asking the user/cardholder to confirm that the transaction is genuine and not fraudulent. Further the priority message may ask the user/cardholder to indicate whether the user/cardholder is interested in having the declined transaction remedied if the transaction is genuine and not fraudulent. In various embodiments, the priority message may be in the form of a text message to a mobile device or an email.

Next, at block 408, on receipt of a confirmation from the user/cardholder confirming that the transaction is genuine and not fraudulent, and the user/cardholder is interested in having the transaction remedied, process 400a may proceed to gather data associated with the declined transaction. For example, these data may include, but are not limited, the user/cardholder identification information, the items to be purchased, the payment amount, and so forth. At block 410, process 400a may proceed to generate a replacement transaction based on the data associated with the declined transaction gathered.

Next, at block 412, process 400a may securely contact the merchant for a bypass authorization code for inclusion in the replacement transaction. At block 414, on receipt and inclusion of the bypass authorization code in the replacement transaction, the replacement transaction may be made available to the user/cardholder to use to re-attempt the transaction, bypassing the declined transaction. FIG. 5 illustrates an example notification message to provide a cardholder with access to the replacement transaction, according to some embodiments. In various embodiments, the replacement transaction may be made available to the user/cardholder by forwarding a uniform resource locator (URL) identifying a location of the replacement transaction. In other embodiments, the replacement transaction may be packaged and forwarded to the use/cardholder.

Continuing to refer to FIG. 4, at block 416, on receipt of a request for a bypass authorization code from a false fraudulent correction service of a payment processor, process 400b for false fraudulent correction service by a merchant may respond with the requested bypass authorization code. As described earlier, the exchange may be provided over a secure communication channel between the false fraudulent correction service of a payment processor and the counterpart of a merchant.

At block 418, on receipt of the replacement transaction with the bypass authorization code from the user/cardholder, process 400b may validate the bypass authorization code. At block 420, on validation of the bypass authorization code, the merchant may proceed to complete the replacement transaction, successfully remedying the falsely declined transaction, and thereby reducing the amount of false fraudulent declines.

FIG. 6 illustrates in further detail components of the false fraudulent correction service of the payment systems provider, according to some embodiments. For the illustrated embodiments, false fraudulent correction service 600, which may be false fraudulent correction service 120 of FIG. 1, may include registrar 602, request acceptor 604, user communicator 606, merchant communicator 608, transaction data collector 610 and replacement transaction builder 612.

Registrar 602 may be configured to register merchants having the complementary ability to provide the bypass authentication codes for inclusion in replacement transactions as partner false fraudulent correction merchants. In various embodiments, the registrations may include identifications of the merchants, communication addresses and protocols of the merchants, in particular, the secure communication protocols supported by the merchants.

Request acceptor 604 may be configured to accept notifications of declined transactions and requests to determine whether the declined transactions are indeed fraudulent, and if not, remedy the declined transactions. In various embodiments, request acceptor 604 may include a communication interface for any of the merchants, acquirers, fraud detection services of payment processors, and/or issuers to provide the notifications of declined transactions, and the requests to determine whether the declined transactions are indeed fraudulent, and if not, remedy the declined transactions.

User communicator 606 may be configured to notify a user/cardholder of a declined transaction, ask the user/cardholder to confirm whether the declined transaction is genuine and not fraudulent, and if so, whether the user/cardholder desires to have the declined transaction remedied. In various embodiments, user communicator 606 may be configured to support multiple forms of communications, text messaging, emails and so forth.

Merchant communicator 608 may be configured to securely obtain the bypass authentication codes from the partner merchants for inclusion in the replacement transactions. In various embodiments, merchant communicator 608 may be configured to support multiple secure communication protocols.

Transaction data collector 610 may be configured to gather data related to a declined transaction. In various embodiments, it may be configured to access the production transaction database of the payment processor to gather the information. In other embodiments, it may be configured to also gather some of the data from the merchants via merchant communicator 608.

Replacement transaction builder 612 may be configured to generate a replacement transaction to remedy a falsely declined transaction for allegedly fraudulent. In various embodiments, replacement transaction builder 612 may be configured to generate the replacement transactions based on the data associated with the declined transactions gathered by transaction data collector 610. In various embodiments, replacement transaction builder 612 may be configured to include the bypass authentication codes obtained from the merchants via merchant communicator 608 in the replacement transactions.

In various embodiments, registrar 602, request acceptor 604, user communicator 606, merchant communicator 608, transaction data collector 610 and replacement transaction builder 612 may be implemented as software components. For these embodiments, registrar 602, request acceptor 604, user communicator 606, merchant communicator 608, transaction data collector 610 and replacement transaction builder 612 may be implemented in any one of a number high level programming languages known in the art, and compiled into executable object codes, executable on the one or more servers of the payment processor. In other embodiments, some or aspects of registrar 602, request acceptor 604, user communicator 606, merchant communicator 608, transaction data collector 610 and replacement transaction builder 612 may be implemented as firmware, and/or accelerated using hardware accelerators. In still other embodiments, some or aspects of registrar 602, request acceptor 604, user communicator 606, merchant communicator 608, transaction data collector 610 and replacement transaction builder 612 may be implemented in hardware, e.g., application specific integrated circuits (ASICs).

Figure 7:
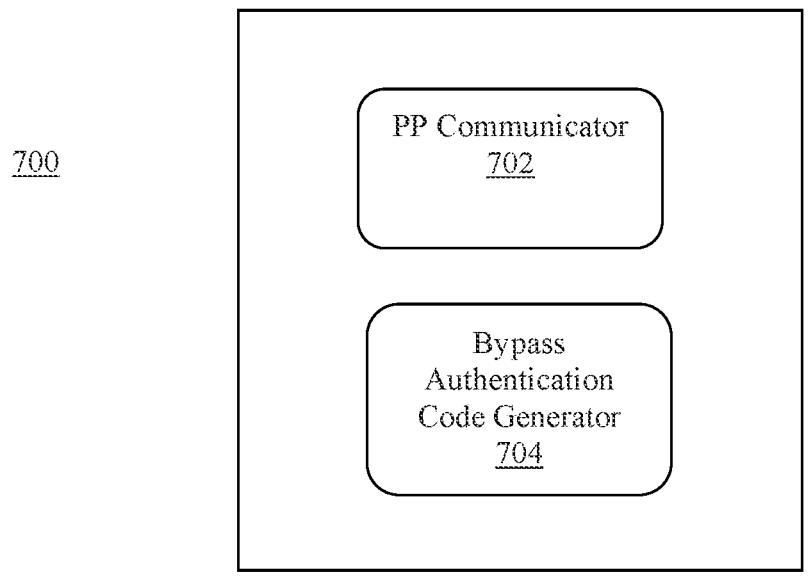
FIG. 7 illustrates in further detail components of the false fraudulent correction service of a merchant, according to some embodiments.

FIG. 7 illustrates in further detail components of the false fraudulent correction service of a merchant, according to some embodiments. For the illustrated embodiments, false fraudulent correction service 700, which may be false fraudulent correction service 122 of FIG. 1, may include payment processor communicator 702 and bypass authentication code generator 704.

Payment processor communicator 702 may be configured to communicate with a payment processor. In various embodiments, payment processor communicator 702 may be configured to report to the payment processor, notifications of declined transactions and requests to determine whether the declined transactions are indeed fraudulent, and if not, remedy the declined transactions. In various embodiments, payment processor communicator 702 may be further configured to securely provide the bypass authentication codes to the payment processor for inclusion in replacement transactions.

Bypass authentication code generator 704 may be configured to generate the bypass authentication codes too be provided to the payment processor for inclusion in replacement transactions. Various secure/cryptographic authentication code generation schemes may be employed to generate the bypass authentication codes.

In various embodiments, payment processor communicator 702 and bypass authentication code generator 704 may be implemented in any one of a number high level programming languages known in the art, and compiled into executable object codes, executable on the one or more servers of the payment processor. In other embodiments, some or aspects of payment processor communicator 702 and bypass authentication code generator 704 may be implemented as firmware, and/or accelerated using hardware accelerators. In still other embodiments, some or aspects of payment processor communicator 702 and bypass authentication code generator 704 may be implemented in hardware, e.g., application specific integrated circuits (ASICs).

Figure 8:
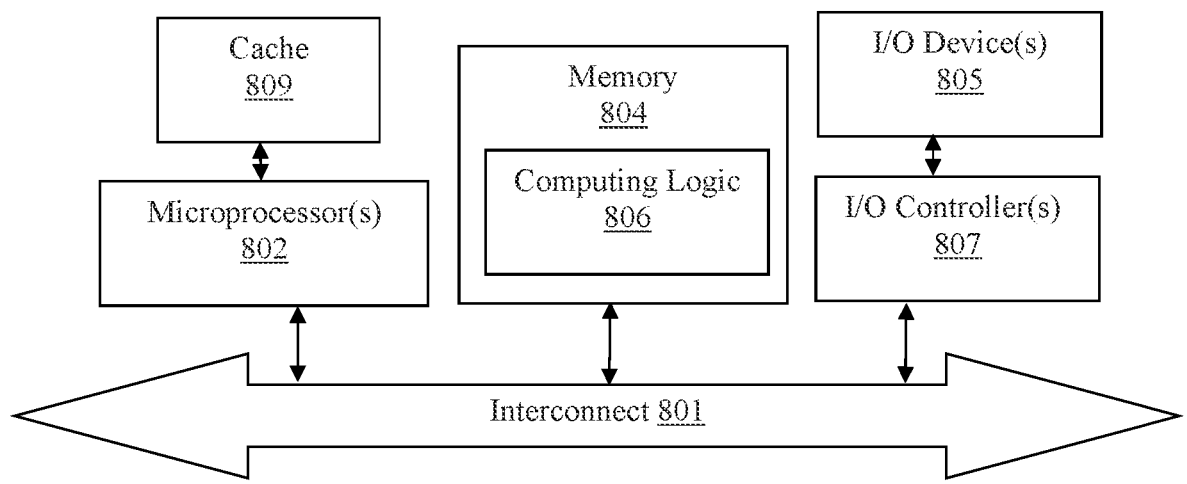
FIG. 8 is a diagram illustrating an implementation of a computer system that may be applicable to computing devices of an issuer, an acquirer, the payment systems provider, and/or a merchant.

FIG. 8 is a diagram illustrating an implementation of a computer system that may be applicable to computing devices of an issuer, an acquirer, the payment systems provider, and/or a merchant. According to an embodiment. The computer system 800 can include a microprocessor(s) 802 and memory 804. In an embodiment, the microprocessor(s) 802 and memory 804 can be connected by an interconnect 801 (e.g., bus and system core logic). In addition, the microprocessor 802 can be coupled to cache memory 809. Memory 804 may include various computing logic 806 to be executed by microprocessor(s) 802. In particular, when employed as a server for payment processor 102 of FIG. 1 or 202 of FIGS. 2A-2D, computing logic 806 may include the components of false fraudulent correction service of a payment processor, e.g., registrar 602, request acceptor 604, user communicator 606, merchant communicator 608, transaction data collector 610 and replacement transaction builder 612 of FIG. 6. When employed as a server for merchant 106 of FIG. 1 or 206 of FIGS. 2A-2D, computing logic 806 may include the components of false fraudulent correction service of a merchant, e.g., payment processor communicator 702 and bypass authentication code generator 704 of FIG. 7.

In an embodiment, the interconnect 801 can connect the microprocessor(s) 802 and the memory 804 to input/output (I/O) device(s) 805 via I/O controller(s) 807. I/O devices 805 can include a display device and/or peripheral devices, such as mice, keyboards, modems, network interfaces, printers, scanners, video cameras and other devices known in the art. In an embodiment, (e.g., when the data processing system is a server system) some of the I/O devices (805), such as printers, scanners, mice, and/or keyboards, can be optional.

In an embodiment, the interconnect 801 can include one or more buses connected to one another through various bridges, controllers and/or adapters. In one embodiment, the I/O controllers 807 can include a USB (Universal Serial Bus) adapter for controlling USB peripherals, and/or an IEEE-1394 bus adapter for controlling IEEE-1394 peripherals.

In an embodiment, the memory 802 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

A framework for false fraudulent correction service has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method, comprising:
   receiving, by a payment processor provider, via a request acceptor of one or more servers of the payment processor provider, a notification of a decline of a first transaction attempted by a cardholder of a payment card with a merchant, for being allegedly fraudulent, and a request to determine whether the first transaction was falsely identified as fraudulent, and to remedy the first transaction in response to a determination that the first transaction was falsely identified as fraudulent;
   determining that the first transaction was falsely identified as fraudulent, and the merchant is a false fraudulent reduction partner merchant, and in response:
      generating with a replacement transaction generator executed by the one or more servers, a replacement second transaction to replace the declined first transaction, the replacement second transaction including a bypass authorization code; and
      sending the replacement second transaction having the bypass authorization code to the cardholder via an electronic communication that includes a Uniform Resource Locator (URL) identifying a location of the replacement second transaction having the bypass authorization code, and the cardholder uses the URL in the replacement second transaction to transact with the merchant bypassing the declined first transaction.

2. The computer-implemented method of claim 1, wherein receiving comprises receiving the notification and request from a selected one of the merchant, a payment acquirer processor, or an issuer of the payment card.

3. The computer-implemented method of claim 1, further comprising determining with the cardholder, by the payment processor provider, via a cardholder communicator of the one or more servers that the first transaction was falsely identified as fraudulent.

4. The computer-implemented method of claim 3, wherein determining with the cardholder comprises sending to the cardholder, with the cardholder communicator, a message asking the cardholder to confirm the attempted first transaction is not fraudulent.

5. The computer-implemented method of claim 4, wherein the message further asks the cardholder whether the cardholder is interested in having the declined first transaction remedied, on confirmation that the declined first transaction is not fraudulent; and wherein the generating and forwarding are performed in response to the cardholder confirming that the declined first transaction is not fraudulent, and the cardholder is interested in having the declined first transaction remedied.

6. The computer-implemented method of claim 1, further comprising registering the merchant as a false fraudulent reduction partner merchant.

7. The computer-implemented method of claim 1, wherein generating comprises gathering with a transaction data collector of the one or more severs transaction data associated with the declined first transaction; and wherein generating the replacement second transaction is based at least in part on the gathered transaction data associated with the declined first transaction.

8. The computer-implemented method of claim 1, wherein generating comprises obtaining from the merchant, via a merchant communicator of the one or more servers, the bypass authorization code.

9. The computer-implemented method of claim 6, wherein obtaining comprises obtaining from the merchant, via a merchant communicator of the one or more servers, the bypass authorization code, over a secure communication channel with the merchant.

10. The computer-implemented method of claim 1, wherein the replacement second transaction expires and becomes invalid after a time period.

11. A system, comprising:
    a memory;
    a computer processor coupled to the memory;
    a transaction data collector executed by the computer processor that is configured to gather transaction data associated with a first transaction, the first transaction being attempted by a cardholder of a payment card to transact with a merchant, and declined for falsely identified as fraudulent;
    a merchant communicator executed by the computer processor that is configured to:
       i) determine that the first transaction was falsely identified as fraudulent,
       ii) determine that the merchant is a false fraudulent reduction partner merchant, and
       iii) obtain from the merchant, a bypass authorization code; and
    a replacement transaction component executed by the computer processor that is configured to:
       i) generate a replacement second transaction to replace the declined first transaction based at least in part on the gathered transaction data of the first transaction, the replacement second transaction including the bypass authorization code obtained from the merchant, and
       ii) send to the cardholder an electronic communication that includes a Uniform Resource Locator (URL) identifying a location of the replacement second transaction having the bypass authorization code;
          wherein the cardholder uses the URL in the replacement second transaction to transact with the merchant correcting the declined first transaction.

12. The system of claim 11, further comprising a cardholder communicator executed by the computer processor that is configured to notify a cardholder of the declined first transaction, ask the cardholder to confirm whether the declined first transaction is false fraudulent, and if false fraudulent, whether the cardholder is interested in having the falsely declined first transaction remedied.

13. The system of claim 12, wherein the cardholder communicator is further configured to receive from the cardholder, an indication of an interest to remedy the falsely declined first transaction the cardholder attempted to engage with a merchant.

14. The system of claim 13, wherein the cardholder communicator is further configured to make available to the cardholder the replacement second transaction having the bypass authorization code obtained from the merchant.

15. The system of claim 11, further comprising a registrar executed by the computer processor that is configured to register the merchant as a false fraudulent reduction partner merchant.

16. The system of claim 11, further comprising a request acceptor executed by the computer processor that is configured to accept a notification of the declined first transaction, for allegedly fraudulent, and a request to determine whether the first transaction was falsely identified as fraudulent, and to remedy the first transaction in response to a determination that the first transaction was falsely identified as fraudulent.

17. The system of claim 11, wherein the request acceptor is configured to accept the notification and the request from a selected one of the merchant, a payment acquirer processor, or an issuer of the payment card.

18. At least one non-transitory computer-readable medium having a plurality of instructions, in response to execution of the instructions by one or more processors of one or more servers of a payment processor provider, to:

receiving via a request acceptor of the one or more servers of the payment processor provider, a notification of a decline of a first transaction attempted by a cardholder of a payment card with a merchant, for being allegedly fraudulent, and a request to determine whether the first transaction was falsely identified as fraudulent, and to remedy the first transaction in response to a determination that the first transaction was falsely identified as fraudulent;

determining that the first transaction was falsely identified as fraudulent, and the merchant is a false fraudulent reduction partner merchant, and in response:

generating with a replacement transaction generator executed by the one or more servers, a replacement second transaction to replace the declined first transaction, the replacement second transaction including a bypass authorization code; and sending the replacement second transaction having the bypass authorization code to the cardholder via an electronic communication that includes a Uniform Resource Locator (URL) identifying a location of the replacement second transaction having the bypass authorization code, and the cardholder uses the URL in the replacement second transaction to transact with the merchant bypassing the declined first transaction.

19. The at least one non-transitory computer-readable medium of claim 18, wherein generating further comprises obtaining from the merchant, via a merchant communicator of the one or more servers, the bypass authorization code.

* * * * *